(12) United States Patent
Jaffray et al.

(10) Patent No.: US 7,647,128 B2
(45) Date of Patent: Jan. 12, 2010

(54) METHODS, COMPUTER-READABLE MEDIA, AND DATA STRUCTURES FOR BUILDING AN AUTHORITATIVE DATABASE OF DIGITAL AUDIO IDENTIFIER ELEMENTS AND IDENTIFYING MEDIA ITEMS

(75) Inventors: Andrew Jaffray, Seattle, WA (US); Michael J. Polson, North Bend, WA (US); Daniel Plastina, Sammamish, WA (US); Eric Louchez, Redmond, WA (US); John W. Terrell, Bothell, WA (US); Kasy Srinivas, Sammamish, WA (US); Mala Munisamy, Bellevue, WA (US); Edward T. Gausman, Bellevue, WA (US); Pradeep Jha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 11/112,026

(22) Filed: Apr. 22, 2005

(65) Prior Publication Data
US 2006/0253207 A1 Nov. 9, 2006

(51) Int. Cl.
*G06F 17/00* (2006.01)
(52) U.S. Cl. ............... 700/94; 707/102; 707/104.1
(58) Field of Classification Search ............... None
See application file for complete search history.

(56) References Cited

U.S. PATENT DOCUMENTS

| | | | |
|---|---|---|---|
| 4,677,466 A | 6/1987 | Lert, Jr. et al. | |
| 4,843,562 A | 6/1989 | Kenyon et al. | |
| 5,210,820 A | 5/1993 | Kenyon | |
| 6,061,680 A | 5/2000 | Scherf et al. | |
| 6,118,450 A | 9/2000 | Proehl et al. | |
| 6,154,773 A | 11/2000 | Roberts et al. | |
| 6,345,256 B1 | 2/2002 | Milsted et al. | |
| 6,381,374 B1 * | 4/2002 | Pourjavid | 382/275 |
| 6,505,160 B1 | 1/2003 | Levy et al. | |
| 6,549,922 B1 | 4/2003 | Srivastava et al. | |
| 6,760,721 B1 | 7/2004 | Chasen et al. | |
| 6,829,368 B2 | 12/2004 | Meyer et al. | |
| 6,970,859 B1 | 11/2005 | Brechner et al. | |
| 6,973,451 B2 | 12/2005 | Laronne et al. | |
| 7,043,473 B1 | 5/2006 | Rassool et al. | |
| 7,058,223 B2 | 6/2006 | Cox | |
| 7,093,296 B2 | 8/2006 | Nusser et al. | |
| 7,136,866 B2 | 11/2006 | Springer, Jr. et al. | |
| 7,191,190 B2 | 3/2007 | Debique et al. | |
| 2001/0031066 A1 | 10/2001 | Meyer et al. | |

(Continued)

OTHER PUBLICATIONS

MusicMatch, MusicMatch Jukebox User's Guide, Feb. 7, 2003, Chapters A1-A6 & 1-9.

(Continued)

*Primary Examiner*—Curtis Kuntz
*Assistant Examiner*—Joseph Saunders, Jr.
(74) *Attorney, Agent, or Firm*—Senniger Powers LLP

(57) ABSTRACT

Methods, computer-readable media, and data structures for building an authoritative database of digital audio identifier elements from digital media accessed by clients. The digital media including one or more media items, such as tracks on a CD. The methods, computer-readable media, and data structures further identifying metadata associated with a media item accessed by a client utilizing the authoritative database of digital audio identifier elements.

19 Claims, 7 Drawing Sheets

U.S. PATENT DOCUMENTS

| | | |
|---|---|---|
| 2002/0001395 A1 | 1/2002 | Davis et al. |
| 2002/0028000 A1 | 3/2002 | Conwell et al. |
| 2002/0033844 A1 | 3/2002 | Levy et al. |
| 2002/0055951 A1 | 5/2002 | Shigetomi et al. |
| 2002/0059584 A1 | 5/2002 | Ferman et al. |
| 2002/0069218 A1 | 6/2002 | Sull et al. |
| 2002/0082837 A1 | 6/2002 | Pitman et al. |
| 2002/0099737 A1 | 7/2002 | Porter et al. |
| 2002/0103920 A1 | 8/2002 | Berkun et al. |
| 2002/0143976 A1 | 10/2002 | Barker et al. |
| 2002/0157095 A1 | 10/2002 | Masumitsu et al. |
| 2002/0178276 A1 | 11/2002 | McCartney et al. |
| 2002/0184180 A1 | 12/2002 | Debique et al. |
| 2003/0028796 A1 | 2/2003 | Roberts et al. |
| 2003/0036948 A1 | 2/2003 | Woodward et al. |
| 2003/0086341 A1 | 5/2003 | Wells et al. |
| 2003/0095660 A1 | 5/2003 | Lee et al. |
| 2003/0135513 A1 | 7/2003 | Quinn et al. |
| 2003/0152277 A1 | 8/2003 | Hall, Jr. et al. |
| 2003/0174861 A1 | 9/2003 | Levy et al. |
| 2003/0182139 A1 | 9/2003 | Harris et al. |
| 2003/0182315 A1 | 9/2003 | Plastina et al. |
| 2003/0236582 A1 | 12/2003 | Zamir et al. |
| 2004/0002993 A1 | 1/2004 | Toussaint et al. |
| 2004/0006575 A1 | 1/2004 | Visharam et al. |
| 2004/0034441 A1 | 2/2004 | Eaton et al. |
| 2004/0172593 A1 | 9/2004 | Wong et al. |
| 2004/0177319 A1 | 9/2004 | Horn |
| 2004/0260682 A1 | 12/2004 | Herley et al. |
| 2004/0262682 A1 | 12/2004 | Lenoble |
| 2004/0267693 A1 | 12/2004 | Lowe et al. |
| 2005/0065976 A1 | 3/2005 | Holm et al. |
| 2005/0091268 A1 | 4/2005 | Meyer et al. |
| 2005/0132401 A1* | 6/2005 | Boccon-Gibod et al. ...... 725/34 |
| 2005/0203992 A1 | 9/2005 | Tanaka et al. |
| 2005/0234958 A1 | 10/2005 | Sipusic et al. |
| 2006/0032363 A1 | 2/2006 | Platt |
| 2006/0168126 A1 | 7/2006 | Costa-Requena et al. |

OTHER PUBLICATIONS

Burges, et al., *Distortion Discriminant Analysis for Audio Fingerprinting*, IEEE Transactions on Speech and Audio Processing, 2003, 10 pp., vol. 11, No. 3, United States.

Kaye, Robert, *MusicBrainz Non-Profit White Paper*, http://musicbrainz.org/papers/mb_nonprofit.html, Feb. 2003, 9 pp., MusicBrainz, United States.

Bohm et al., "Metadata for Multimedia Documents", GMD Integrated Publication and Information Systems Institute (IPSI), SIGMOD Record, vol. 23, No. 4, Dec. 1994, pp. 21-26.

Swierk et al., "The Roma Personal Metadata Service", IEEE, Dec. 2000, pp. 107-116.

Supplementary European Search Report in European Application No. EP 06 73 8892, dated Aug. 10, 2009, 8 pgs.

* cited by examiner

METHODS, COMPUTER-READABLE MEDIA, AND DATA STRUCTURES FOR BUILDING AN AUTHORITATIVE DATABASE OF DIGITAL AUDIO IDENTIFIER ELEMENTS AND IDENTIFYING MEDIA ITEMS

TECHNICAL FIELD

Embodiments of the present invention relate to the field of identifying media items. In particular, embodiments of this invention relate to methods, computer-readable media, and data structures capable of building an authoritative database of digital audio identifier elements for identifying media items accessed by users.

BACKGROUND OF THE INVENTION

Due to recent advances in technology, computer users are now able to enjoy many features that provide an improved user experience, such as playing various media and multimedia content on personal, laptop, or handheld computers, as well as cellular phones and other portable media devices. For example, most computers today are able to play compact discs (CDs) and have an internet connection capable of streaming and downloading audio and video so users can enjoy media while working on their computers. Many computers are also equipped with digital versatile disc (DVD) drives enabling users to watch movies.

Such users are naturally desirous of metadata information identifying the media accessible via their computing device. Data providers are therefore interested in providing a metadata experience that accurately and quickly identifies a selected media item accessed by a user. As such, conventional systems attempt to identify media items in any number of ways, using data tangential to the media item, rather than the media item itself. For example, identification codes associated with media items or groups of media items, metadata associated with the accessed media item, or other previously identified media items stored near the media item of interest, may all be employed in an attempt to identify an accessed media item. These methods are fraught with error, however, because identification is not based upon the media item itself, but rather tangential data associated with the media item. Moreover, because many media items are stored in different formats, conventional systems have had difficulty identifying media stored in an unfamiliar format. In addition, metadata associated with media items is error prone. Much of this metadata is user-entered, and may misidentify the media item or include incorrect, misspelled, or out-of-date information. In addition, the conventional practice of utilizing identifiers associated with a media collection, such as a compact disc (CD), to provide matching may also introduce error through misidentification of similar or incorrectly matching identifiers. Moreover, such systems have difficulty identifying solitary media items not downloaded to a user device as part of an album.

Unfortunately, these issues are not addressed by any conventional system. Conventional techniques provide identification only through tangential data, such as metadata matching or identification number matching. Such conventional techniques provide no assistance for individual media items having no metadata, incorrect metadata, or missing identifiers. Such conventional techniques also fail to perform well where media items are stored in a foreign format. Accordingly, a solution that enables identification of a media item identically in each case, irrespective of the format of the media item or the metadata associated with the media item is desired. There is a need, therefore, for a method or system whereby any media item may be identified based upon the actual content of the media item itself, rather than tangential data associated with the media item. A solution that enables identification of any media item, in any format, with no other identification or metadata is desired.

SUMMARY OF THE INVENTION

Accordingly, a method (or a computer-readable media or a data structure) for building an authoritative database of digital audio identifier elements from digital media accessed by clients and for correctly identifying metadata associated with a media item accessed by a client is desired to address one or more of these and other disadvantages. The method comprises uploading a candidate base digital audio identifier for each media item on multiple copies of digital media accessed by one or more clients, processing the uploaded candidate base digital audio identifiers to create an authoritative base digital audio identifier for each media item from the digital media, and adding the authoritative base digital audio identifiers to an authoritative database of authoritative base digital audio identifiers associated with other digital media. For example, embodiments of the invention may be well-suited for preparing an authoritative database that may be shared with multiple users to quickly and correctly identify a media item based upon its content.

In one aspect of the invention, a method of building an authoritative database of digital audio identifier elements from digital media accessed by clients is disclosed. The digital media includes one or more media items. The method comprises uploading a candidate base digital audio identifier for each media item on multiple copies of digital media accessed by one or more clients. The uploaded candidate base digital audio identifiers are processed to create an authoritative base digital audio identifier for each media item from the digital media. The method also comprises adding the authoritative base digital audio identifiers to an authoritative database of authoritative base digital audio identifiers associated with other digital media.

In another aspect of the invention, a computer-readable medium having stored thereon a data structure representing a digital audio identifier element for identifying an audio CD of audio media items is disclosed. The data structure comprises a unique album identifier associated with the audio CD and at least one track element. The track element corresponds to an audio media item on the audio CD. The track element comprises a candidate base digital audio identifier and a candidate confirmation digital audio identifier.

In still another aspect of the invention, a method of identifying metadata associated with a media item accessed by a client is disclosed. The method comprises receiving at least one specimen digital audio identifier associated with a media item. The specimen digital audio identifier is uploaded from a client accessing the media item. The method further matches the specimen digital audio identifier with an authoritative base digital audio identifier, retrieves metadata associated with the authoritative base digital audio identifier; and returns the metadata to the client.

In yet another aspect of the invention, a computer-readable medium having computer-executable instructions for identifying metadata associated with a media item accessed by a client is disclosed. The computer-executable instructions for performing steps comprises receiving instructions for receiving at least one specimen digital audio identifier associated with a media item. The specimen digital audio identifier being uploaded from a client accessing the media item. The computer-executable instructions for performing steps also comprises matching instructions for matching the specimen digital audio identifier with an authoritative base digital audio identifier. The computer-executable instructions for performing steps comprises retrieving instructions for retrieving metadata associated with the authoritative base digital audio identifier and returning instructions for returning the metadata to the client.

Alternatively, the invention may comprise various other methods, computer-readable media, and data structures.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
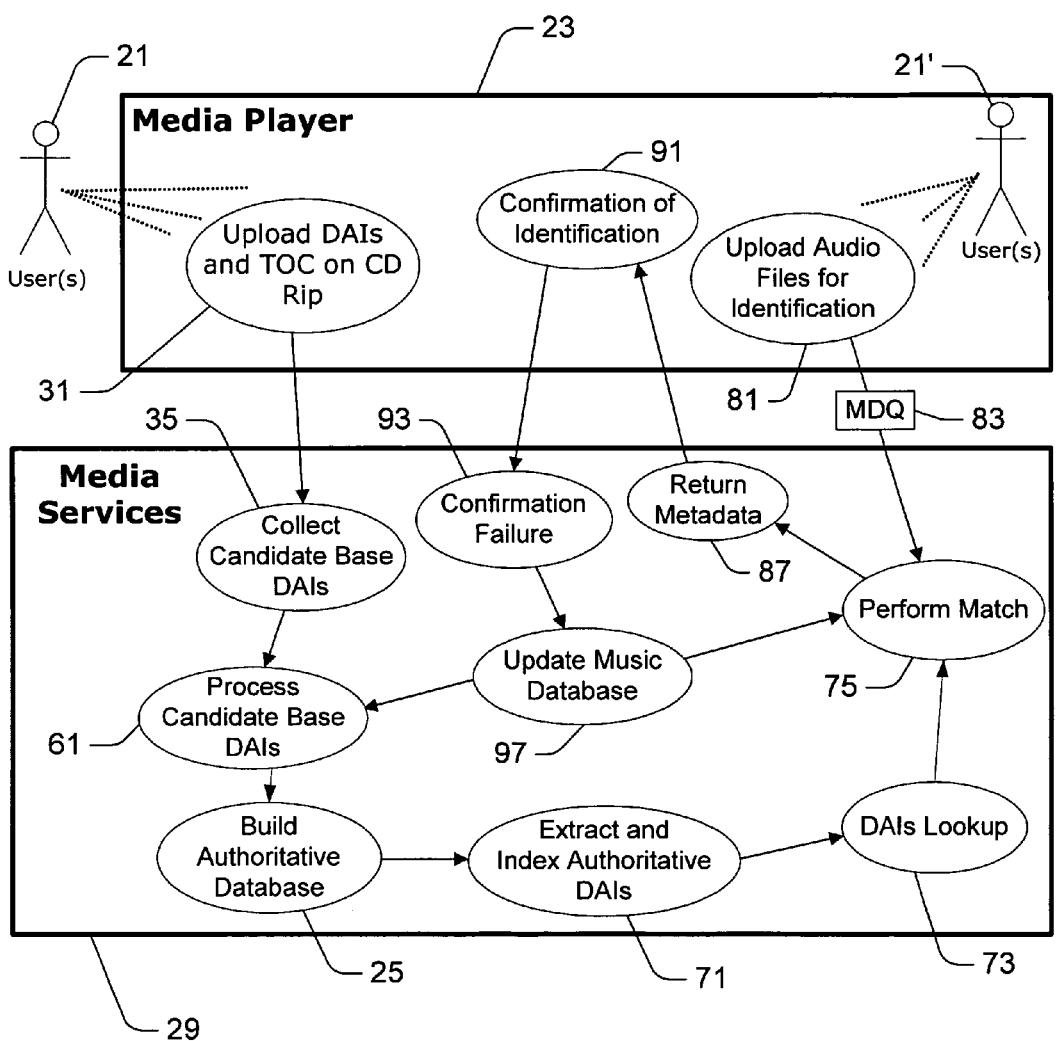
FIG. 1 is a flow diagram depicting a workflow of the present invention for building an authoritative database of digital audio identifier elements and for identifying media items accessed by clients.

Referring now to FIG. 1, a flow diagram depicting a workflow of methods of the present invention for building an authoritative database of digital audio identifier elements and for identifying media items accessed by clients utilizing a media player is shown. The details of this flow diagram are discussed in detail herein, and will be referred to throughout the following discussion.

Method of Building an Authoritative Database

In general, a user, or client, 21 may utilize a media player 23 on a computing device (e.g., a computer 130, see FIG. 7) to access media items stored in the memory (e.g. a hard disk drive 154 of FIG. 7) of the computer. An example of such a media player 23 is the Windows® Media Player by Microsoft Corporation of Redmond, Wash. Other media players or means for accessing media items are also contemplated as within the scope of the present invention. The term computer or computing device may comprise any number of devices, including but not limited to personal, laptop, or handheld computers, as well as cellular phones and other portable media devices, among others. To begin, the user 21 typically accesses a media item with the media player 23. Accessing such a media item can occur in many ways, including opening a media item stored in the memory 154 of the computer 130 or saving (i.e., ripping) the contents of an audio compact disc (CD) to the computer, among others. Once accessed by the media player 23, the user 21 may desire additional metadata relating to the contents of the accessed media item. The following method facilitates matching of appropriate metadata with media items accessed by such a user 21.

First, an authoritative database of metadata matching media items must be built at 25 on a server 29 serving the metadata associated with the media items. In one example depicted in FIG. 1, such a server 29 of metadata is supported by Windows Media Internet Services (WMIS). As used herein, the term server 29 can mean one or more servers working together. In any event, to begin this construction, the method for building an authoritative database 25 of digital audio identifier (DAI) elements comprises uploading a candidate base DAI 31 for each media item from multiple copies of digital media (e.g., compact discs (CDs)) accessed by one or more clients 21.

As used herein, the term "DAI" connotes an identifier of digital audio. In one example, such a DAI comprises sixty-four dimensional vectors of single-precision floating point numbers for identifying digital audio based upon multiple physical characteristics of the actual audio (e.g., music) contained in the media item. An example of a DAI is shown below as an array of sixty-four 4-byte single-precision floating point numbers:

−6.946318, 2.086578, 0.361108, 1.221748, 2.837087, 1.386783, 1.966391, 0.448375, −20.897249, −0.975747, 5.043533, −8.346107, 4.418811, 9.238695, 2.234773, −4.468442, −2.617096, 5.547550, −0.960682, −8.863153, 1.365220, 3.736820, −8.263194, −8.704166, −0.915178, −3.908056, −4.839724, 3.292097, 0.295364, −6.583572, 2.353827, −6.329947, 6.788795, 1.948128, 1.455992, −1.238343, 0.969089, −7.560797, −0.127568, −3.596416, −4.641246, 2.757606, −3.432780, −13.090852, −11.206924, −5.684618, 8.277532, 5.793239, 4.531317, −3.000287, −1.782439, −0.747263, −2.504754, −5.246303, −1.231380, 0.044564, 4.611495, −1.274044, −1.393486, 3.086715, 0.428811, 5.493120, −8.295065, 3.107833

In particular, the following publications describe how to identify a media item by the contents of the item itself: U.S. Patent Application No. US 2004/0260682 A1, entitled System and method for identifying content and managing information corresponding to objects in a signal, assigned to Microsoft Corporation of Redmond, Wash., U.S.A. and *Distortion Discriminant Analysis for Audio Fingerprinting*, by Burges et al., published in IEEE TRANSACTIONS ON SPEECH AND AUDIO PROCESSING, Vol. 11, No. 3, pp. 165-174 (2003). Such systems and methods may be utilized herein to compare candidate and specimen DAIs with authoritative DAIs, as discussed in greater detail below. The details of such systems and methods would be readily understood by one skilled in the art and will not be discussed in greater detail here. As used herein, the term "candidate" emphasizes that such DAIs are not considered confirmed, or authoritative, but rather are collected to facilitate determination of an authoritative base DAI that may be used as the basis for metadata matching, as discussed in detail below.

In any event, the method exemplified in FIG. 1 uploads DAIs at 31 from multiple users 21 and collects the candidate base DAIs at 35 from each media item ripped by the user to collect information about the content of each of the accessed media items. In one example of the present invention, the digital media comprises a CD and the uploading 31 occurs when a client 21 rips a CD or inserts a CD into a CD-ROM drive (e.g., optical disk drive 160 of FIG. 7). For example, a client 21 may rip the CD to his personal computer (e.g., 130 of FIG. 7) for use with a media player 23. Because a great number of CDs are ripped each day by the many users 21 of media players 23, such as the Windows Media Player. Thus, the present method can utilize this data to its advantage, utilizing media items provided by users to construct its database of metadata and mapping of metadata identifiers. Rather than obtaining a copy of every single media item for which it has metadata to manually create the authoritative DAI and map it to the correct metadata, the present invention utilizes data uploaded by users 21.

Figure 2:
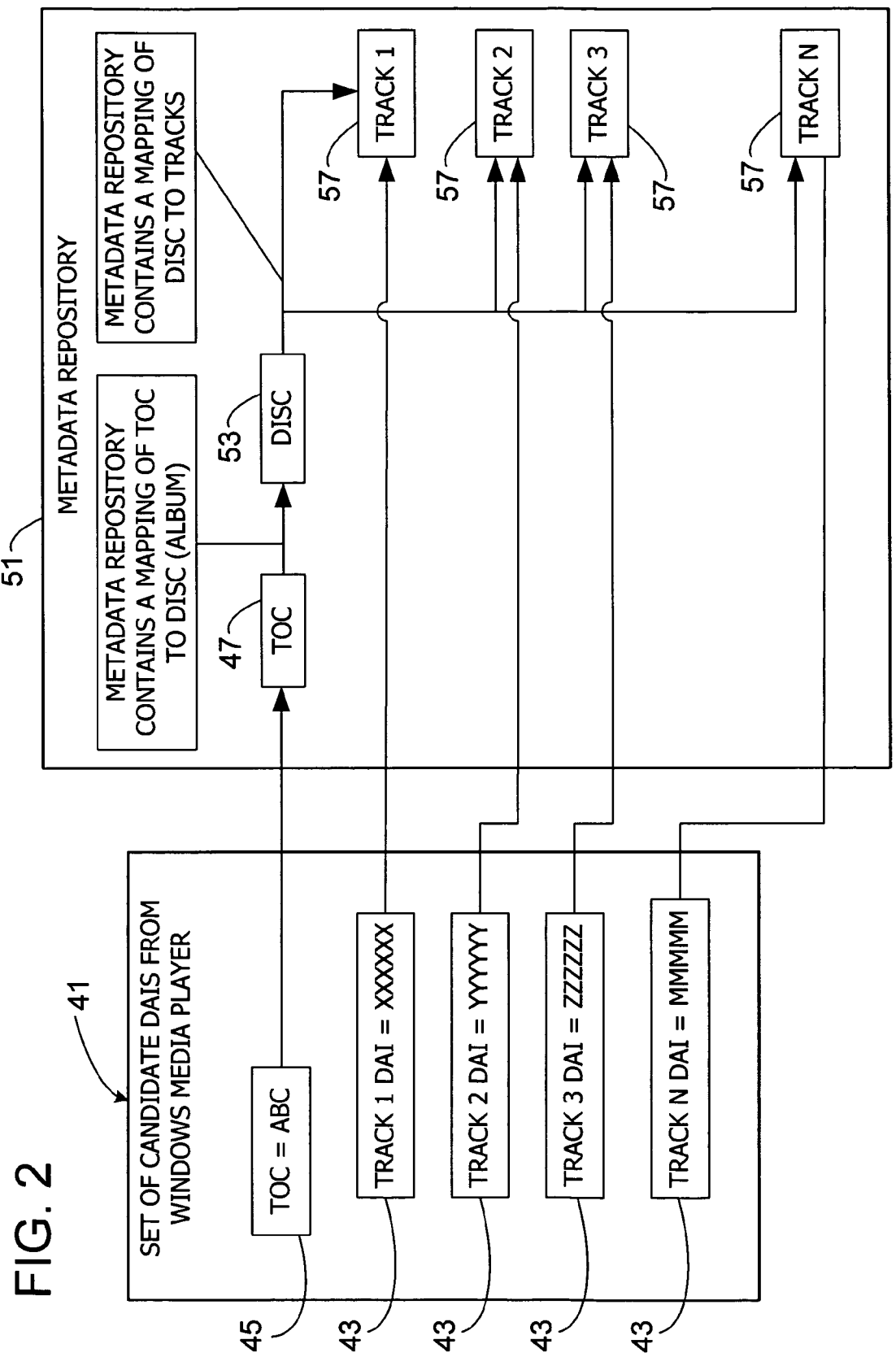
FIG. 2 is a flow diagram depicting a further workflow of the present invention for building an authoritative database of digital audio identifier elements.

As noted above, the method of the present invention makes use of users 21 because they collectively have a complete collection of the media items required for identification. When the user 21 rips a CD to a computer 130, the media player 23 will upload several candidate base DAIs at 31 for each track, or media item, of the CD to the server 29, along with a known identifier such as a table of contents identifier (TOC) from the ripped CD. The TOC of the CD is an identifier that, in this instance, the server 29 already has in a repository that is mapped to the album metadata, which is in turn mapped to the track metadata of the album. With the TOC and the candidate base DAIs collected at 35 by the server 29, the server can generate and map an authoritative base DAI for each track of the ripped CD. As shown in FIG. 2, a set of candidate base DAIs, generally indicated 41, are uploaded during ripping of a CD accessed by a client 21 via a media player 23. Each candidate base DAI 43 is associated with its respective track, along with the TOC 45 for the entire CD. The TOC 45 is used to map to the corresponding TOC record 47 in a metadata repository 51. The metadata repository in turn maps to a CD 53 which has an associated collection of track placeholders 57, each differentiated by track number. These track placeholders 57 may then be mapped to the candidate base DAIs uploaded by the user 31 to the corresponding track in the metadata repository.

For example, ripping a CD of media items to the user device triggers the uploading 31 of the candidate base DAIs from each of the media items. The candidate base DAIs are determined from small portions, or traces, of each media item taken at a particular time interval from the beginning of each media item. These portions of the media items may be of any desired length (e.g., 6 seconds) and may be utilized to identify particular media items. In other words, a DAI will identify a user's media item independent of format (e.g., Windows Media Audio (WMA), MPEG Audio Layer-3 (MP3), Transform-domain Weighted Interleave Vector Quantization (VQF), waveform (WAV), Real Audio (RA), Advanced Audio Coding (AAC), etc.) using an identifier that is generated from the media item itself, rather than from metadata associated with the media item. Using this identifier, a method embodying aspects of the invention can return the relevant metadata (such as track title, artist, etc.) corresponding to the media item. In one example, the candidate base DAIs are collected at a first time interval of 30 seconds from the beginning of each media item. By collecting the DAIs at the same time interval for each track, the method ensures a consistent comparison between the media item as accessed by different users.

The uploading the candidate base DAIs at 31 further comprises uploading a TOC associated with each of one or more compact discs accessed by the clients 21. A TOC is included with many CDs for identifying the contents of the CD. TOCs, however, are imperfect identifiers because some CDs do not have TOCs, and other CDs having similar media content may have different TOCs. In addition to uploading candidate base DAIs and TOCs at 31 from a CD of a single user, the method may further comprise uploading a candidate base DAI for each media item from another N copies of the CD accessed by respective N distinct clients. The method may also comprise uploading a TOC 45 associated with each of the N copies of the CD accessed by respective N distinct clients. In this manner, the method of the present invention can upload data from multiple clients with respect to the same CD. This data may then be analyzed, as discussed below, to determine which of the candidate base DAIs is most representative of a particular media item.

In addition to the uploading 31 of candidate base DAIs, the method also comprises uploading a candidate confirmation DAI for each media item on the multiple copies of the digital media accessed by the users 21. The candidate confirmation DAI differs from the candidate base DAI in that the candidate confirmation DAI can be used to verify the accuracy of any match provided by the candidate base DAI, as discussed below. In such instances, uploading the candidate base DAIs at 31 comprises uploading at a first time interval of each media item on the digital media, while the uploading the candidate confirmation DAIs comprises uploading at a second time interval, different from the first time interval, of each media item on the digital media. In one example, the candidate confirmation DAIs are uploaded at a second time interval about 20 seconds later than the first time interval for uploading the candidate base DAIs. In another example, the candidate base DAIs are uploaded at a time interval of 30 seconds, while the candidate confirmation DAIs are uploaded at a time interval of 50 seconds. In such an example, DAIs are only collected from those media items of at least about 60 seconds in length, because otherwise the candidate confirmation DAIs cannot be collected for a particular media item. The time interval between the collection of the candidate base DAI and the candidate confirmation DAI may be of any duration without departing from the scope of the claimed invention. In particular, the time interval may be reduced or the collection times moved closer to the beginning of a media item so that media items of shorter duration may also be harvested for candidate base DAIs and confirmation base DAIs.

An exemplary XML disclosed in Appendix A shows one implementation of how such an upload of a TOC for a CD, a candidate base DAI for each track of the CD, and a candidate confirmation DAI for each track of the CD can occur. In this example, a single TOC associated with a CD is identified. In addition, each of four tracks from the CD numbered one to four includes a candidate base DAI and a candidate confirmation DAI.

Again referring to FIG. 1, once the DAIs and TOC are uploaded at 31 to the server 29, the method further comprises processing the uploaded candidate base DAIs at 61 to create an authoritative base DAI for each media item associated with the digital media. This portion of the process takes the several candidate base DAIs for a particular media item and processes them into a single authoritative base DAI, thereby establishing a DAI that will be used as the benchmark for a particular media item. This processing to create an authoritative base DAI may include a number of different techniques without departing from the scope of the present invention. In one example, processing the uploading 61 of candidate base DAIs comprises comparing each of the uploaded candidate base DAIs associated with a respective media item with one another. By comparing the candidate base DAIs from different users, but with respect to the same media item, the method can determine if there are differences in the candidate base DAIs as uploaded from different users and process the authoritative base DAI in an effort to minimize those differences. This processing helps overcome the problem of how to obtain an authoritative base DAI associated with a particular media item when the candidate base DAI for any given track can vary from one client to the next. The solution utilized herein comprises uploading candidate base DAIs at 31 from multiple clients and then aggregating those candidate base DAIs to form the authoritative base DAI. Once the server 29 has received some required number of candidate base DAIs for each of the tracks on a CD (e.g., seven candidate base DAIs per track), the method will then proceed to generate the authoritative base DAI, as discussed in greater detail below.

Processing the uploaded candidate base DAIs at 61 comprises generating an authoritative base DAI element associated with each respective media item uploaded from the CD for identifying each media item of the CD and generating a unique album identifier identifying the CD. In one example, to generate the unique album identifier identifying the CD, a method such as illustrated in FIG. 1 may select the most common TOC of the various TOCs associated with a particular CD as an authoritative TOC. Other ways of generating the unique album identifier are also contemplated as within the scope of the claimed invention.

The processing of the candidate base DAIs at 61 may further comprise aggregating each of the uploaded candidate base DAIs associated with a respective media item to combine the DAIs into a single measure. In one example, the aggregation is a simple aggregation per dimension using all candidate base DAIs in that dimension. In particular, the aggregating of the uploaded candidate base DAIs may comprise averaging together all of the uploaded candidate base DAIs associated with a respective media item, excluding any outlier candidate base DAIs. This average candidate base DAI may be utilized as the authoritative base DAI.

Figure 3:
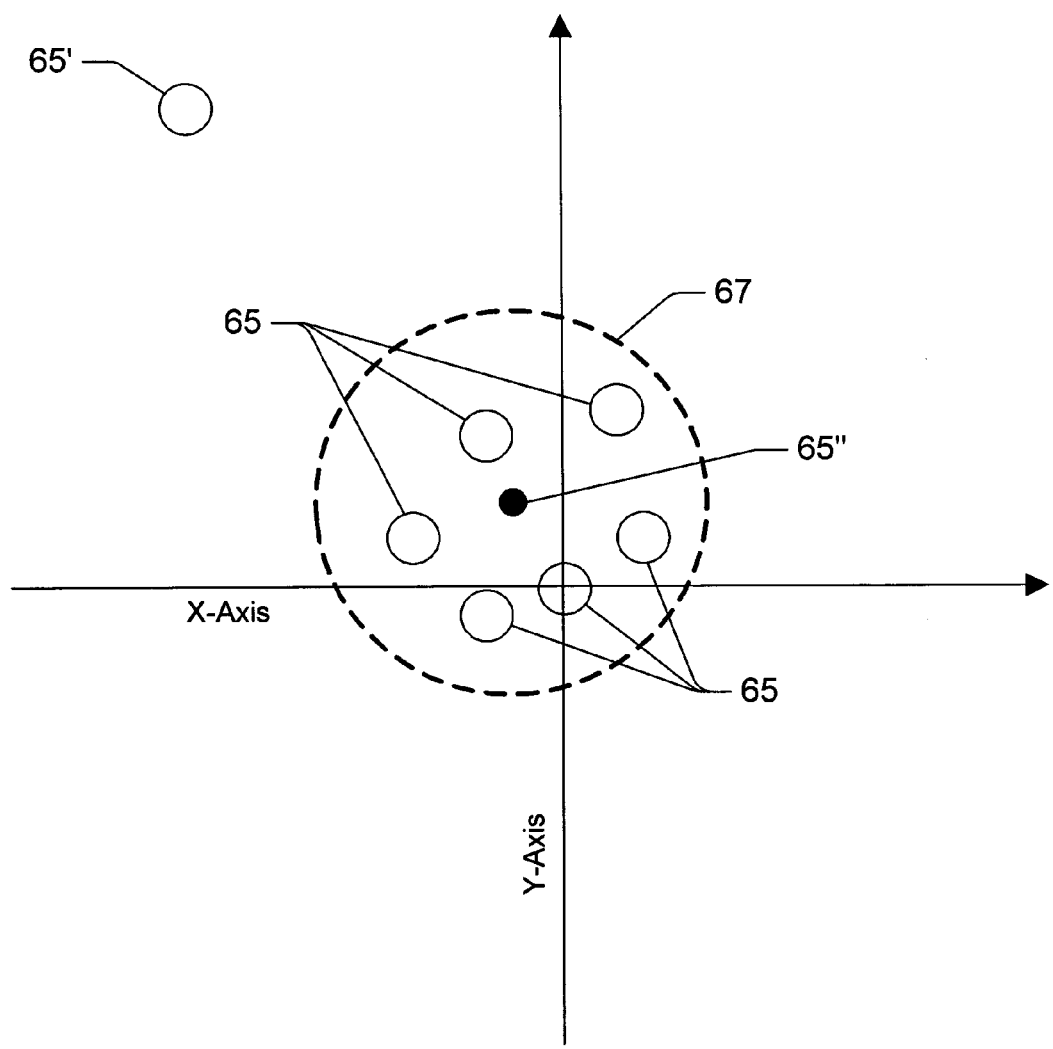
FIG. 3 is a graph illustrating the present invention ignoring any candidate base digital audio identifier whose difference from the other candidate base digital audio identifiers exceeds a threshold.

Referring now to FIG. 3 and as would be appreciated by one skilled in the art, each DAI 65 can be thought of as a point in space, its location based upon the sixty-four dimensional vectors of single-precision floating point numbers introduced above. None of the candidate base DAIs 65, although similarly located in the x-y plane of FIG. 3, is necessarily identical to the other candidate base DAIs. These differences in the candidate base DAIs can be caused by hardware (e.g., CD drive differences) or physical damage to the compact disc (e.g., a scratch), among other things. In some cases, it is possible that these differences can cause one or more of the candidate base DAIs 65 to be significantly different from the majority uploaded for a particular media item. For example, an outlier candidate base DAI 65' is depicted in FIG. 3, having a significantly different location than the other DAIs 65. These location differences are analogous to the outlier being distanced from the others, and such distances may be measured in any number of ways (e.g., Euclidean distance).

Candidate base DAIs fitting this category are considered outliers and are not included in the calculation of the authoritative base DAI. There are multiple methods of determining which, if any, of the candidate base DAIs are outliers. In one example, the processing may comprise ignoring any candidate base DAI wherein the difference between the ignored candidate base DAI and the other candidate base digital audio identifiers exceeds a particular threshold. Such a threshold may be set to remove outlying candidate base DAIs that should not be included in the processing calculations. In one example, a statistical calculation first determines the mean, or average, of all candidate base DAIs. This mean 65" of each of the candidate base DAIs is depicted in FIG. 3. From this mean 65", the method calculates the standard deviation of the candidate base DAIs 65, 65'. In one example, any calculated difference between a candidate base DAI and the mean 65" of the uploaded candidate base DAIs that is greater than some multiple of the standard deviation is considered an outlier and is ignored (i.e., removed) from the averaging calculation. For the example of FIG. 3, the multiple is 1.5 times the standard deviation, as depicted by the circular threshold 67. Because the difference between the outlier candidate base DAI 65' and the mean 65" of the uploaded candidate base DAIs is greater than the threshold 67, the outlier may be ignored for purposes of the average calculation. After removal, the average 65" of the remaining candidate base DAIs may change slightly, due to the removal of the outlier 65'. This revised mean candidate base DAI may be utilized as the authoritative base DAI. Other standard deviation multiples and methods for setting the threshold are also contemplated as within the scope of the present invention.

Once the authoritative base DAI 65" associated with a particular media item is determined according to the process at 61 noted above, these values will be added to an authoritative database, to build the database at 25 and add to the store of authoritative base DAIs associated with other digital media. At this point, uploading 31 of additional candidate base DAIs pertaining to this particular digital media item may be terminated, because the authoritative base DAI has been determined. The method now readily utilizes the authoritative base DAI to identify this media item. Uploading of other candidate base DAIs relating to other digital media continues until authoritative base DAIs associated with those media items are added to the authoritative database. As each new media item is accessed by users 21, additional candidate base DAIs are uploaded at 31 from multiple users, collected at 35 by the server 29, and processed at 61 to generate an authoritative base DAI. For previously generated authoritative base DAIs, no candidate base DAIs need be uploaded, unless the method determines that the authoritative base DAI is in error, as is discussed in greater detail below.

After at least a portion of the authoritative database is built at 25, the method embodying aspects of the invention extracts the authoritative base DAIs from the authoritative database at 71 and performs an index generation that facilitates retrieval of the authoritative base DAIs. The details of such an extraction and indexing would be readily apparent to one skilled in the art and will not be discussed in detail here. The generated index is then processed according to an optimized DAI lookup scheme at 73 and matched to a database of metadata at 75 for matching with the authoritative base DAIs. For example, an album identifier may be assigned to each authoritative base DAI, whereby metadata associated with that album may be readily matched to the appropriate media item. The foregoing process is ongoing as new media items are built into the authoritative database based upon users 21 accessing new media items. In the meantime, however, the method may also identify and present metadata to users associated with previously authenticated media items, as will now be described in detail.

Identification of Metadata Associated with a Media Item

Referring again to FIG. 1, once the authoritative database contains authoritative base DAIs for each of the previously accessed media items, a method for identifying metadata associated with a media item accessed by a client 21' may be employed. In particular, this method comprises receiving at least one specimen DAI associated with a media item uploaded at 81 from a user 21'. In one example, the method requires receiving at least X number of specimen DAIs from the client 21' associated with the particular media item accessed by the client. Obtaining the at least X number of specimen DAIs associated with a particular media item comprises bundling the identifiers into a metadata query (MDQ) 83 uploaded to the server 29 for matching with the authoritative DAI database.

More particularly, obtaining the at least X number of specimen DAIs comprises collecting one of the X number of specimen DAIs at a first time interval from the beginning of the media item and collecting each of the remaining X specimen DAIs at a multiple of an offset from the first specimen DAI. This requirement of additional collection of specimen DAIs offset from the first specimen DAI is undertaken to combat the inherent problem relating to the collection of the DAIs as a function of the audio stream. In particular, any variation in the audio stream from user to user results in a slightly different specimen DAI. For example, if one media player 23 begins data collection slightly earlier or later than another, the specimen DAIs associated with each of the players will be slightly offset from one another. As discussed above, the authoritative base DAI stored in the authoritative database should be generated such that it will match as many small variations of the specimen DAIs as possible. The DAI matching process does not require an exact match, but rather is a proximity calculation comparing the specimen DAI to the authoritative base DAI, based upon the sixty-four dimensional vectors of single-precision floating point numbers associated with each DAI. In one example, a first specimen DAI may be taken at a time interval of 30 seconds from the beginning of the media item, the same as the authoritative base DAI, while the additional specimen DAIs are taken at an offset multiple from the first DAI. For example, if five specimen DAIs are taken and the offset is 186 milliseconds, the DAIs are taken at 30 seconds, 30.186 seconds, 29.814 seconds, 30.372 seconds, and 29.628 seconds, respectively. A different time interval from the beginning of the media item, other offsets, and collecting different numbers of specimen DAIs are also contemplated as within the scope of the claimed invention. The time interval from the beginning of the media item, the length of the offset, and the number of specimen DAIs collected may be altered to tune the method to enhance the likelihood of a proper match.

In addition, the method contemplates obtaining multiple specimen DAIs associated with multiple media items, or tracks, from a single CD. Here, the method according to an embodiment of the invention receives a plurality of specimen DAIs collected at a first time interval from the beginning of each track of a CD and subsequently thereafter at an offset from each respective first time interval, as described above.

Once the specimen DAIs associated with a particular media item are uploaded, the method may attempt to match the several traces of the specimen DAI with an appropriate authoritative base DAI of the authoritative database. The several traces are packaged into the MDQ 83 and sent to the server 29. The server looks for matches by comparing the several specimen DAIs of the MDQ 83 with the authoritative base DAIs of the authoritative database. If only one match is found, the metadata associated with that match is determined to be the appropriate metadata. If no matches are found, the method may default to utilizing another matching method, namely matching based upon a TOC or other metadata associated with the media item on the client's computer. If more than one match is found, the method attempts to determine the best match, utilizing whatever information is available, including album TOC, other media items grouped with this media item that may form part of a common album, or other metadata associated with the media item on the client's computer.

Once the specimen DAI is matched with an authoritative base DAI, the method retrieves metadata associated with the authoritative base DAI and returns the metadata to the client at 87, as shown in FIG. 1. In another example, the method may prioritize the identifiers, for example making the specimen identifiers the default and utilizing other metadata associated with the media item on the client's computer only as a backup identifier.

When returning the metadata to the client 21' at 87, the method additionally returns an authoritative confirmation DAI to the client at 91. In one embodiment, the authoritative confirmation DAI, which is associated with the media item, verifies the accuracy of the match. The method then utilizes the media player 23 on the client's device to determine if the authoritative confirmation DAI matches a specimen confirmation DAI of the media item. If the client media player 23 determines that the authoritative confirmation DAI does not match a specimen confirmation DAI of the media item, the client sends, and the server receives, a failure notification at 93. The failure notification comprises a unique track identifier (e.g., WMContentId) and the amount of the confirmation failure discrepancy. Upon receipt of the failure notification at 93, the server 29 logs the received failure notification associated with the authoritative base DAI. A database at the server 29 stores, for example, a counter for each WMContentId created. This counter may be incremented each time a confirmation failure occurs. Once a counter has exceeded a predetermined count (e.g., logging at least X number of failure notifications for a given media item) the method of the present invention determines that the authoritative base DAI is inaccurately matched. At this point, the method will begin the process of uploading and collecting additional candidate base DAIs at 31 from multiple clients 21 for regenerating the authoritative base DAI for this media item and updating the authoritative database at 97. Because the specimen DAI is not accurately matched to the authoritative base DAI, the authoritative base DAI is determined again to ensure the accuracy of the metadata match.

In another example, the method may further comprise comparing the retrieved metadata related to the authoritative base DAI with metadata associated with the media item uploaded from the client. Such a comparison is another method of determining the accuracy of the retrieved metadata. Other methods of confirming the accuracy of the match are also contemplated as within the scope of the present invention.

Data Structure

Figure 4:
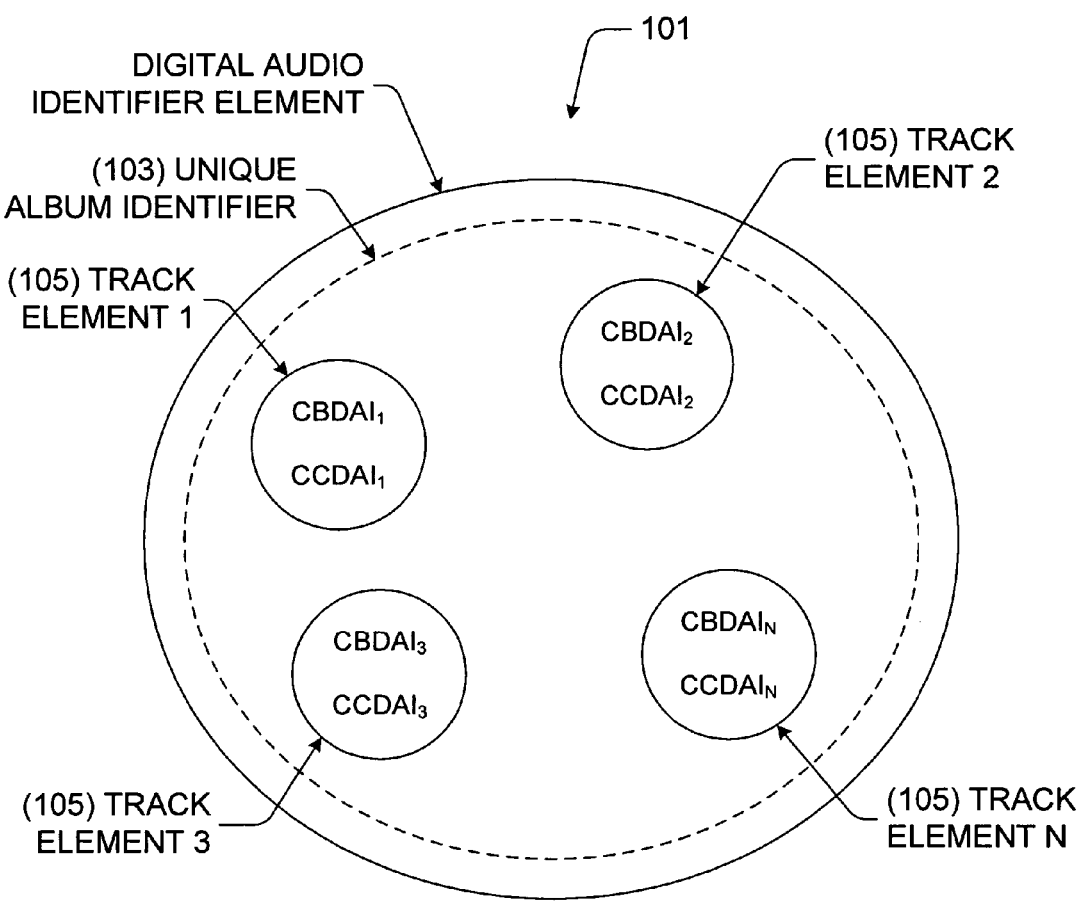
FIG. 4 is a diagram of a data structure of a digital audio identifier element of the present invention.

Referring now to FIG. 4, an exemplary computer-readable medium having stored thereon a data structure, generally indicated 101, representing a digital audio identifier element (DAIE) for identifying an audio CD of audio media items is shown. In general, the data structure 101 comprises a unique album identifier associated with the audio CD, generally indicated 103, and at least one track element 105. In the example depicted in FIG. 4, track elements one, two, and three 105 are shown with a Nth track element, demonstrating that the data structure may include any number of track elements. For a standard Redbook CD, for example, up to 99 tracks may be included. Each of the track elements 105 corresponds to an audio media item on the audio CD. Each track element 105 comprises a different candidate base DAI (CBDAI) and a different candidate confirmation DAI (CCDAI), generally as set forth above. In particular, the candidate base DAI comprises a sample of the media item taken at a first time interval, and the candidate confirmation DAI comprises a sample of the media item taken at a second time interval. In one example, the first time interval is about 30 seconds from the beginning of the media item, and the second time interval is about 50 seconds from the beginning of the media item.

Computer Readable Media

Figure 5:
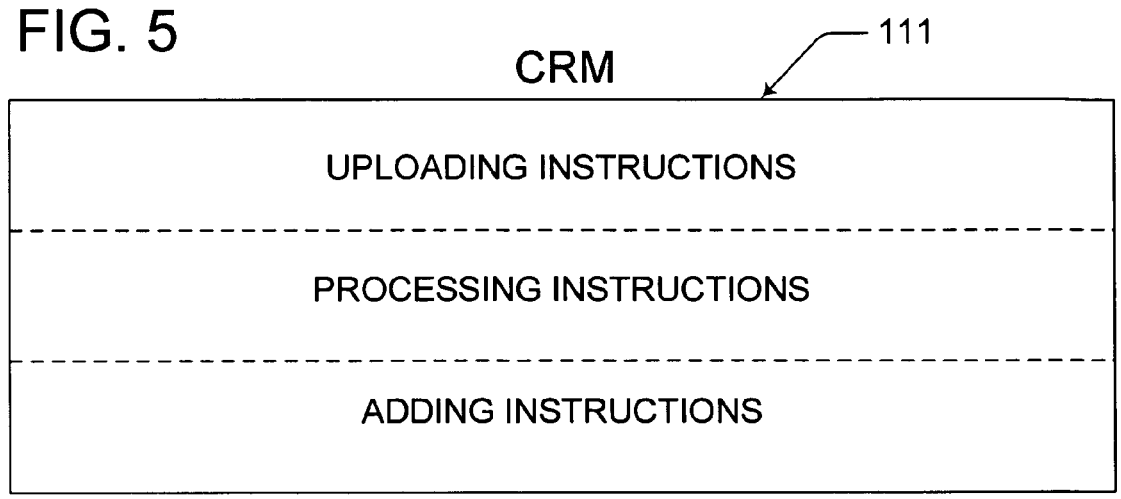
FIGS. 5 and 6 are diagrams of computer-readable mediums of the present invention.

The present invention further comprises one or more computer-readable media, generally indicated 111 in FIG. 5, having computer-executable instructions for performing a method of building an authoritative database of digital audio identifier elements from digital media accessed by clients, the digital media including one or more media items. In particular, the computer-executable instructions comprise uploading instructions for uploading a candidate base DAI for each media item on multiple copies of digital media accessed by one or more clients. The computer-executable instructions further comprise processing instructions for processing the uploaded candidate base DAIs to create an authoritative base DAI for each media item from the digital media. The computer-executable instructions further comprise adding instructions for adding the authoritative base DAIs to an authoritative database of authoritative base DAIs associated with other digital media.

Figure 6:
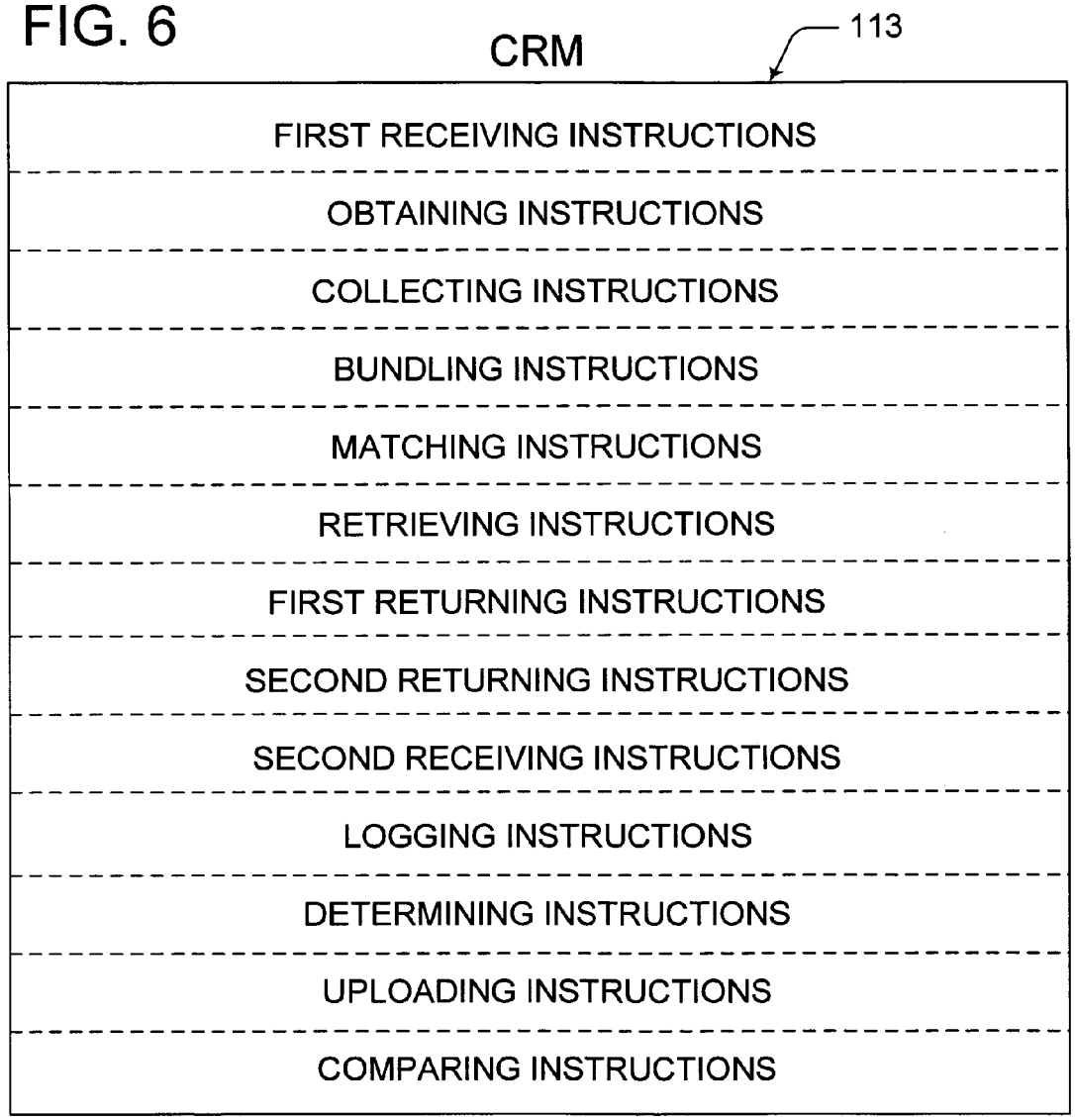

The present invention additionally comprises one or more computer-readable media, generally indicated 113 in FIG. 6, having computer-executable instructions for identifying metadata associated with a media item accessed by a client. In particular, the computer-executable instructions comprise receiving instructions for receiving at least one specimen DAI associated with a media item. The specimen DAI may be uploaded from a client accessing the media item. The computer-executable instructions further comprise matching instructions for matching the specimen DAI with an authoritative base DAI. The computer-executable instructions further comprise retrieving instructions for retrieving metadata associated with the authoritative base DAI. The computer-executable instructions additionally comprise returning instructions for returning the metadata to the client.

In another example also depicted in FIG. 6, the computer-readable media may further comprise computer-executable instructions comprising obtaining instructions for obtaining at least X number of specimen digital audio identifiers associated with the media item from the client. The obtaining instructions may further comprise collecting instructions for collecting one of the at least X number of specimen digital audio identifiers at a first time interval from the beginning of the media item and collecting each of the remaining X identifiers at an offset from the other identifiers. In another example, the obtaining instructions may further comprise bundling instructions for bundling the identifiers into a metadata query uploaded to an authoritative digital audio identifier database. In still another example, the computer-readable media may further comprise computer-executable instructions comprising returning instructions for returning an authoritative confirmation digital audio identifier associated with the media item to the client to verify the accuracy of the matching. The computer-readable media may further comprise computer-executable instructions comprising receiving instructions for receiving a failure notification from the client when the client determines that the authoritative confirmation digital audio identifier does not match a specimen confirmation digital audio identifier of the media item. The computer-readable media may further comprise computer-executable instructions comprising logging instructions for logging the received failure notification associated with the authoritative base digital audio identifier and determining instructions for determining that the authoritative base digital audio identifier is inaccurately matched when the logging logs at least X number of failure notifications. The computer-readable media may further comprise computer-executable instructions comprising uploading instructions for uploading additional candidate base digital audio identifiers for the media item from multiple users for creating a new authoritative base digital audio identifier when the specimen digital audio identifier is not accurately matched to the authoritative base digital audio identifier. In addition, the computer-readable media may further comprise computer-executable instructions comprising comparing instructions for comparing the retrieved metadata related to the authoritative base digital audio identifier with metadata associated with the media item uploaded from the client to determine the accuracy of the retrieved metadata.

General Purpose Computing Device

Figure 7:
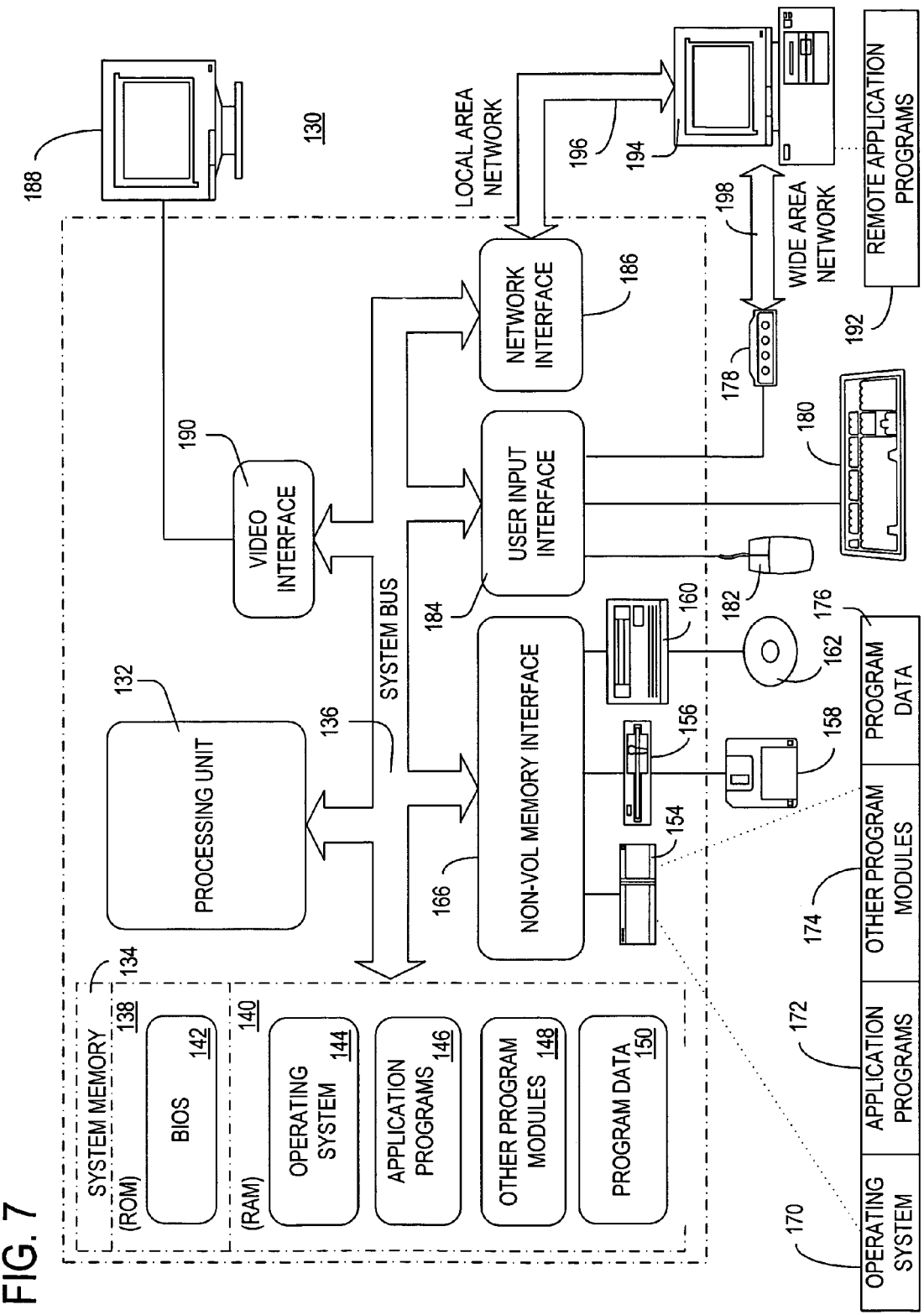
FIG. 7 is a block diagram illustrating one example of a suitable computing system environment in which the invention may be implemented.

FIG. 7 shows one example of a general purpose computing device in the form of a computer 130. In one embodiment of the invention, a computer such as the computer 130 is suitable for use in the other figures illustrated and described herein. In one example, the client computer or device discussed above may be embodied by computer 130. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. In one example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 196 and/or WAN 198 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, in one example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer 130 acting as the server 29 executes a method such as described above for building an authoritative database of DAI elements from digital media accessed by clients, wherein the digital media includes one or more media items. The computer 130 or its components uploading a candidate base DAI for each media item on multiple copies of digital media accessed by one or more clients. The computer or its components processing the uploaded candidate base DAIs to create an authoritative base DAI for each media item from the digital media. The computer or its components adding the authoritative base DAIs to an authoritative database of authoritative base DAIs associated with other digital media.

Also in operation, a computer 130 acting as a server 29 executes another method such as described above for identifying metadata associated with a media item accessed by a client. The computer 130 or its components receiving at least one specimen DAI associated with a media item, wherein the specimen DAI is uploaded from a client accessing the media item. The computer 130 or its components matching the specimen DAI with an authoritative base DAI, retrieving metadata associated with the authoritative base DAI, and returning the metadata to the client.

Additionally in operation, a computer 130 acting as a server 29 executes another method such as described above for retrieving metadata associated with a media item accessed by a client. The computer 130 or its components receiving, if available, a TOC associated with a compact disc (CD) accessed by a client. The computer 130 or its components further receiving, if the TOC is not available, at least one specimen DAI associated with the CD, wherein the specimen DAI is uploaded from the client accessing the CD. The computer 130 or its components additionally matching the specimen DAI with an authoritative base DAI, retrieving metadata associated with retrieving metadata associated with the CD based on either the TOC or the authoritative base DAI, and returning the retrieved metadata to the client.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

APPENDIX A

```
<?xml version="1.0" encoding="utf-8" ?>
<DAI trackCount="17"
toc="11+96+45B2+760B+ADCF+E2D6+12081+17D51+1AADB+1D850+20A23+233E8+
262F7+2904F+2B75C+2FB04+338E4+386DF+3DC2A">
    <track number="1">
        <base>qjUbP5bkW0FKcG/BLtgyQAduqD8fxac+cMoCwVzWBcEIOKa/oEqgvlz
ENcHjzg1BEvJXwZ2xoEBL56s+HbCfwCJ8pkAdOaI/bLgRP9ahysDCnKBApPZ
OwYIHTb6icxPBwTaoQZ4/fsBCBeu/lNQPwLXqhr2g0oBArSmxP/NkbEGkTEz
AQbawQM5V3j/Cyi8+gX9zQLwTN8AT9JTA3NqXwFJKKEHO1MFAXM0WP
7awE8GCo9jAycEbQUPJDkHK5qRA4D2cP37Q9b5HSbi++JaoQH7HlcGHkEF
A08U5QT029r/sbZs9OWSRwb1juEC7HaxAQiNLQNdvG799Y/VAYI7KwA==
        </base>
        <confirm>1yZSQJOeCMBWSb3BMz0XwKBgBsCgVzTBRvUgwTTwA0GuvrpA
CLSfwF3L0MALepTBfK8GwF06/r7qMAdAYj08P4hFKj9mkjVA135FQe5nyU
Df9yjBvL0cQF57ZcFifqTAeGXpwKROIsD8Pbm+a0GMwFUmpMGpu1hBD51
OPyWze8G+gIe/mpnhQOFwRMHpsAZBXz6PP1z6XMAG/6FAjPQNP+XUZcG
19p3A7TC+QAagGj4P90e/5CY1QUQ0+b8AKFTA939dwKWMncAEQ9pANGe
DQHtJBUAlfg5AXL8xQKI0cL+hTkVAdaaOPrY8pL6zJK5AOYoTv112zMAaD
T3AdY5/QA==</confirm>
    </track>
    <track number="2">
        <base>j48xwDuINMDzeBBBIsWpwbDKCMCPzEy/n0VbP+CDbEDA7ba/vbTd
v23ZF0E1XzVA/do1QCEsG8AfLbbBOKMyQVQX+MHi2txBWxgzQY8/HMH
EKxxBs2oiQcXlH8Dr8nTB9oQdQc5+Lz/H/Y4/WUAhwamfgsHvsOy9M6QrwfI
McUB+g2jAXY+BQP4Q/cCu9gDBqaXQPzuFE8A/E4HBW2f8P4soGUAzZD1A
LCRGQGhHgr84MgrBNqmvwBe+F8GVcDNB/e9KwRsNuj++9d7Am2h0wJp2p
EBTfibBCvCrP1HItD83rKPAKUyLwEtgwb6n6YK+ywHxvpCmDcGV2RrBA
WASvw==</base>
        <confirm>vs13wSAftkHEgadBzpzvQMf7DsDK0pZB2F+NwLEzR8CEcTPBqeZ
vQPJWwD9kADo/raHPwGrfyz6A2APB6OeCwGy+E0CgCxzBw5jawPNYlcBa
DC5Bhs8MwUlyDUEzrJJAtCQCwbq9k8DZ0GJBgimNPnNzwcDI6Cu/OqkywK
msEsFrfu3AIi0FQTDZOcDjRRjBepYyQE1ziL6UzWjA1c07wPnNm0CHIU3AIu
TzP1DvRkAZFIVAnu+zP2QejsDZOLa/1EjIQCYOFsFDEJ8/GqaAvnWzhkBfv01
ASBRUQY19g0CqJhbAvLduv2zrwj9AgUPBifHeQCWCQb8tB7E/swaEwA==</
confirm>
    </track>
    <track number="3">
        <base>qdqmvxLsMkHJwGnAFuucwCZ8P8HVsavAz66uwQAG3cGroedAg/k7Q
VCeZcEeFUHB4aPpv751GcCUVVy/PP7qP5gVTcH6vJfAk4yuwC8yEsHoqzW/
oI49wSHuGUDFG+g//fO+wVHZNcG4FW1A1k8TQbKno8EsnihBmHU6QMwV
AL9sGc7ArtUYvwKMZ8DGIuJAT3skwEEIA0ERiB1AbJb1v1QaWcDJtP8/wBU
zwLZBAz8BfYS90vKav0QOfT//7G1A9nRTwWCf2D9Hkow+atSUQL2OUUD
MuUpBzuIkQOZ7S0FA0fRAbC2AwMhgY8DF7FW+iumEQIroR8H+D7Y/uy0C
wQ==</base>
        <confirm>/fXNQKebtD1MkBjBmRI/QEU9Cr8tQFq/IxmeQD3A1sEX4R3BSimQ
wcOq9781EMNA2pgrwX5v6EDSz+LAu5AMwdtYaUHQ1jPBo5FjwVYOnsFYa
Q5AZfIRQQ2muMH1zrzA7mf/wFdmqb/Y9jFBgRMAQApK1MERDwS963oJwe
pU8MC8zYJBm5EawSEXHMBEYCrB/urHP3OCQb9NUu1AB3QyQaAq1MCnR
```

APPENDIX A-continued

```
uw/pfIJQWF46ECR615AzDm7weWP1797wZS8cqSnv3zNpkB6gJG/2jofQNFC1
r9oH6fASqrJvOYZD8GgkGZAyDgBQOHI+L5J2B3Byl41P3+v0ECNF5JAbWy
Cvw==</confirm>
</track>
<track number="4">
  <base>c9d1PvPJ5UFdHyJB6kuPwLc/hsHWEKpBwRgaQfJ3R74H2RhAeUF4Q
YG/hMD4xFBBwII3wV7gHj60Lq7AfqBvwJvXeUF1BCHBwpTYQFUFj7/0LQJ
BwDkpweBgJUE/ddpAaxmePopo1kBWW1dAAzASwJvWSkCLHMxAE5pZQK
1+RUHa5cpA2CY5QVAtNL+kiMBAeGGgv5PLyEB1n1RAuceQwHSoTMCRiA
nB2BEPwXKh2MAyU5dAiwCdQPRL3j7c+2nAZWAIP7Tlhz+CysW/UdknwWJ
A17/wLdW/+8SuPwTsA8BgXZrA4gPevydHLkEjsuvAgLN9wctHWT9/Bx/AIsk/
QQ==</base>
  <confirm>J0XsQOEKm0EJV85AKhWfwLpdREApBsRAnE0wwRlEJUHABILB
qoIswSV+UcE/tcLA0+Q2wcIGlD6PyuvAMJofwdrpCMIbZ0BBjsAZQfgxk0A5O
/7AgqU/wfqkysDfVva/BJeFQHL/EkGWA5LAS4IGQP/wxMAJ1AZBbJxFQBkj
N0BgMx/Bse8IQTjp9UAoEa+/fvFCQVybu0AVMSNAUhbNP04qD8GeYY7Ak
43tQKvETcAwO7e/Kg41wEOUjsFx0SW/IMrEP0XN2j8nrJxA9d8dP97+A8FVR
6FApKplQK7LusAiOie/UwdkwPaOWUDezp7Awh1OwCXWuUDkYEpAMh2+
vg==</confirm>
</track>
<track number="5">
  <base>hMvcwTunq0G2X61Arn52QRAEycFFHqNB42mWQHZAQj9mMD7AA
XbfQS+9osCvbRXB6xHJQH7fBUFu8LnAvNBbwKYMK0ATWKS/TvLRwGkp
nkCn1BA+O+q6wEBIBUBUqmzA5+4rQQ1HvEBqvQvB2xjCwIqGFsH9OLFAtt+
GQFS48MDMUefAFRcOQT2kVj8HDktAFtnYv2GW98A+8BDBWopHQA2S
TsE89AbBfWIFQJfbXEEkUaZAZy9HQAQH1EB9KZC/nF81QMFrSkCMk1hAf
uqFQF1WB0FZNCdA+GNbQUmBJ0DCAIU/dm8iwazDbUGlQ8XAClcAwEao
LUHtYQNB/2R/vw==</base>
  <confirm>6s9fQKxctEAe+YvB1Ya9PR/m4r+HhzJAP1ygv6uJv0CgiAfBVuiFQ
UOBpMDSZGlBKfKIQRb4DkEOqyO/ONX5wPtGCsHyCXPAYFDJwbbgjD4ua
xvBhDr7P10Z3UAapwHBD/L8QB10CkEWTMPBekSwwa7BMEH7qbs/CsyTwT
39yUBqCoJBPz3Bvy22Tb8yotXAy0mZwS/6WsAy/YpA5WDrwBVdGkFb1NbA
mAhFwUYLMEFRimBBz3MDQWAW1r/0QtfA0tiiwDxTKEDMRZhArCkoQP
MQbcHCjH/AypTuv4kplr9Oeq1Au7/dvxYVqcCI8+vANa9OwDC1rEA5b5dAfi
MnQA==<confirm>
</track>
<track number="6">
  <base>3iMRwij/AUGWqx1BTu/FP+/CDsHZlKa/n6DtQFf8tEBr3RfAKUiSv9c/v
r/SizjAbehWQAZ4Zr9tcZY//Lj+wDoRzz92uMRADsSQwJ+0/0BgtJm/RXiuQBb
a/8AnRz6/z/Kev8hYCsFvx8XAXy0mwcbtF7/A2hRBKuwbQWYb1MGMkpxAV
PpNwcZ9AEGTOx5AM501QaPvicCVbIbB3y9nQSV3Db6lIQ1ANPTPvZDJe0Cr
uaPALMYwP/1b9kDRqQA+OH2PP8hR3L+Pg1fBNoIRQKP2yr+xgcrA0ttXQM
sTbUCmBrE+VAhLwGrJncA5zknA2QfGvwHlHsAClQPB8u5lwA==</base>
  <confirm>rWwJwjL6FEFx6hJBR18jvzkB7MAR3gVBkoE4QN9RIUB0LAxA/d9
uQMsqHkDonUjAPfeQwEp5u8H4uXW/g7WpwNckKT9jng9A2CxUwaInN0Et
UdnAO8XsP8AUfMCy9FW/uKiAQCMKfMBPB6ZAAEM3QHJzFEHrsXhB51
3eP/DZAMABgCNBJC8Xwd6S3cBUOg9AK0+pwPjBX0FofdJAiJeTwX8e5r/7q
1NAw8MvQNLYrsBJjK6/vd8dQCgNFUGCMRjBuvRCQVtjMcGwvjPBByVrPx
cE/kAxXQLBNHMQwRFzBMF3u2vBsnH0wAk4D8G0McTATp6UQORWD0G
d+YQ/q3yXQA==</confirm>
</track>
<track number="7">
  <base>dDqlQeMzkEFmNDNBWv/ewDcRA0HELTBBWUjQQEtllkBPfFDBY7
GLwH4ydL8IKYO/eTIcQTD11r9NhZtAVIXfwGhFLcBja6JBCyZIwCuEG0G+b
YXBpzjnv+zMAMHITd/Asz1Bv60KUsEmGbQ/3yLfQNtHMkFbhhrBDf8XwTG
UfMGssfXA4TEMQcoaD752f5lAdsSsQNqsDMEajI6/kvgTwZjzG8H4KcW/P+q
mwCmzAsAZjuE+prFzQeLFiMDtSO2/Vz3Xv6lbsMDijqvAxLTGPyFu2MCutN
C/roHJQGLhQMCN/6O/l2WpvniBrsFPNjJBE5z3P30zVcCQmrbA5jrBQA==<lb
ase>
  <confirm>FOGAQZ+rskHKQd1AyL/7vx0Ybj/T08NBtNozQTUu7z6HLAzBScs
3QQ3aJL8fy2dB8k49wVp2CD8nPsRA3vJQPxU7mEFII9NAI2EEQd/DtEB0ePR
A5TN8wbv8TsDfYCLAgWSmvzVM7T8/3m0/XydawKdIkkHY0wJB3MG6Px5
HzMCpJRfByEJZwFFuW8C1P6q/heSlwKTzAUGKxMPAqCJSwEc3JUCj0zPA
7YRCQRX6JkAcKw/BYb3zwPGU0L/WZtLAv8yHPU8JCUGlxVRAJnRrwVV+
DUHZQPFAnIdoQFsgLkB40QrAlRimQAWYt0BgXHG/IYdsQKtLDsHanx/BL
i+CPw==</confirm>
</track>
<track number="8">
  <base>RRvrQJHOqMHrz7JArEiPQJnsW8F9cxLAoIQjQT8EocGz8vS/dajxQN+
JkcBD8NLAXIMMQU27R8F885pBf7Wawee+YMGHVHw/K1TmPs2HnkBiNxt
BM3wBwFN6HUFZ0da/v0UVv4aJ8UB3tzNAHOyeQGIHMUG5OHZA0DFLQ
Ho1NMG5A0FAK9+twKgBRkAvO5lBFeoUQQEErfECs/CvBDzB9QW5qdsC6O
KJAsAirwC1kjcAO0CHBKqMdQcACuD9myatAWUDJQNl6kMDwRVa+B/fnQ
Guq18BrJyRAorGWQMHZRkFml2HAwGnZPl3gcEBP7YjBBLg9P1ZmBsEcy9
Q/VbCdvw==</base>
  <confirm>ens9wEl5L8CzB0HAGGJWQMvRd8DM/bBB5H4ZwbeU6cFnJuBAH
z9QwV/8KD9C0VbA4rMyQXmPhsG4PoPAZTplwe2RmcBi2BfA8gQqQCgWG
D+MkVFBnBTMvu9XJkFMFV/BDt6AQewQkMD6tLrAhj5vwZqN70E9PaHBg
11pQJZ618D0tpLAE53Vv4uNiUE68V5BvP0mwT7FHEFI+OJAnhhTQAQGuU
```

APPENDIX A-continued

ADW2fAvAHWwLpE474OgJPB9lTRwELuDEB3P4pAITEMwfUWKb/Zo1PBq
NrbvvtDMMHBpJJAqR9uwCJMCMFtozVBdKZgwcCRfz+mgSHAvoosQbkgi8
GA2cQ+r8yDPw==</confirm>
</track>
<track number="9">
  <base>oi7owZuAMUB51flAIqkewcSa1UAfmgw/hqz5wCmhyb/CDpHAjUNGw
a8rXcGE57W/ejWQwHZFTkBwNBVB6Kv0vuNlqz9TOT7Bnd24wBsdNkFBeC
FAi92lQBDuf8GNO5NALgSCQO0dgUB3VoNAVvE0QDohcUDf1LK/x7MnQJ
gDPkCBNF/BjSkzwcS44cCBCZU+8gOLP5ZqhcBtQ+ZAA8eCv+DUZkHC3mL
BFBbwPllNccAladTAJYTdQNVNrEAhGaFASYIMP8qPgEDXZJlAcWhNwdNj
OT7AkAvBKIIUQVnrJEC19r+/izBSQG6ptcDbiOjAZXSOP7j5XkBXe/JAgR8v
QA==</base>
  <confirm>MOv5wWLCKkHwck5BkpVpQNnACkEc1OlB2uNlPuudAUHSMY1
A/CoPwdKYE8HSiBvANzscwfiGRcGU6RBBbZpcvsSKZT+keoFBffTTQCQaI
UGRRexARN0zwFWsgsDLZPdAK8WowIuvAj9IWyfAdyVmQLGjJkFVLeXAk
8KjvrjgQkAhSfVA56c4wcdQzr+drSFANfYlQR9hPcC0GIBBH//gQEtqIUDZ7S
C/v5UVQXBv9cDsMuxAPDZ5QEHPO0ETGPnAykUjv88jQMGJXlC9HZclQM
7qfMBf2NdA2GwUQLwpK7+Z2as//mIjwUNm2MAzCRXA/fs9wBpTtEDHjw7
BxG27PQ==</confirm>
</track>
<track number="10">
  <base>QLvVwOIQikAgTE3BsfxSQZELMcD10BG/URt+Qf6QUcEysru/xkAMw
U0HdcADMVpAd0MYwdt3/kCmwVHBG3FSwATwgUARAAZBjB7eQE1z0cB
hIAZB5CVPP65paMErVd++qoLTQDH7/cCQqSxBOx4DwfLsaUDCM+1AJnvg
QGLmCsFB2B48qSAJQVislEHoArVAMKivQIP8MkFSVVK/brKSQTFTJ0C75
5M/B2OvwGqvhMAxu1zAfso2Qc18KEAxhK/A2e3MwO4cOkD5LUnB+eepv2
L1rMBbjvTAMnQDQUxorL4HwFc/XE6QQRO34cDkcYbB7/7KwJJxlcFJUQ7B
Pwv5Pw==</base>
  <confirm>maUiwR7VCkAiN7DBr9lNQDnlO8BtK73A/lHKQBRN88BqQ81Ap
75owNApB8FcygRB06N6wTe2lj/95yjA9BLSwRjKZECEZ/U+LVg5v3tsbsD/LH
hAW43gwJL14L+5CnVBoJmpQA9kD0D1gRq/YbVTwddsDEGPmilAo82JQD
OOaEC3sl/AkLpeQKoBCsF39FtB+SmPQET2vsCFG55ASleAwbebCcGTjvC/V
qgowBbDVMH9JBhBwjg9QDi1ccAV3TU/G1gCwES31EDaI/a/zFo3weQ4mUC
CM07ANoqgP5uNf0GTnpFBQ2ugQBWk2L8Cr8M/YykAwe50E0AdDYlAOlVz
QQ==</confirm>
</track>
<track number="11">
  <base>ebxZQJuYyMCktIpAhxVBwKX+q0FYKbJAYSBYQKYrhj+3lghBzfeqw
MUqo8BuMyjBTDpCQDwTMMF2yJRAuNldPy5gRMB2YYZAibePwbgC20Dx
BQfBcUVCQdKIxkDwEurA6l1AwWzrEsEF7pFBwW2pQMhq6L+/IZJASXzfw
P+oIkCI8V5BM3oCwWej2T+37po/lBx2wOmhW0FIGh5BrLyGv+2ZmsByPBhB
cg+kwIMK98CcDq9A0j4AQTFBhsF+NevANz3YwPJ7ScAQLOHALjDNQAtk
U0BHvozAXI5kvyXOxr5FdmvBmiUgwU+/fkCkRoXAWNgUwacI7MB7xmLA
T1I2wA==</base>
  <confirm>9yPbwSewUsEBN0FA/ftmwXuEv0AQga7BrqzBwDvNDUHkcUvBW
/T9v3N+UsBZF81AFxOowEspmMCIsPbAZh0PQTG5D0A1di3ACFk6wfCr7zxF
20ZAsmUKwfdzRUFNngXBFUqUQMOkFMA1AAVBk/FpwdPbesBqUj1BETT
8Pk65N0Bt/nlAa7XWO3v000C93Ue/DWNpwJVbBECgnxNATn5XQF7IJcDqw
jG/4kK1wNbR70DnCvu+6lgxwUOaE8Fom/bAzETEwOTNXsDeCjPAmOsaP61
4C0FzFC/AZbu5QIZjtr/WAGhALH/wQI8uBD/2N6c/wjQjwBYOusBr+y5ALgz1
wA==</confirm>
</track>
<track number="12">
  <base>TfD0P/zE60A8MbpAodWIP9Opx0HueInBDKBtwYMeykDC3wTBQmy
wRyvN8CyIX1An7ZoQCzJiMAAuxtBQPcxQPUoPkGTiyxBQFNoQFZF/kDmy
h3Ai0oXwYfUEkFNa7bAON0KQHL164r/kxinBdsT/vnPfnMCnpRxAjLQGwMj6
WEABN/3Aa52dQGEr1kCbsLu/qpGEP7E5KL+JO85A227Lv8cXUj8L2FQ/dQy
WwMouF8FQ7aHBk3/7QG9ZMcF2FRg+crJGQAHii789YiJBQr4qwRubtsCsVg
hAZoDZv5SPFL947UdAxXxOQF7mZ8GtQCXAhFuDwMKKsSsCmwBs/ZgDsw
A==</base>
  <confirm>7gWcwdPzDEGzr/M/3wVVweKqxEAhOpZBcSgLQRLgbMDgXQNB
HnsGQXE5kT4WmdlAHdeOQaLsoUAne4BB6ndZv80sk8Ab57W+PXtZQWY7
EEFo/sJAENTHQD5vK0BuoI9AmghpQHXAwMCYEn5ALOohP/1AAsA0txJB
5jb0QChiCcHmuWg/x9hXPzO8gUBpnnxPANCmKwIetGEAvLrfAxjgrP26yEMH
36X1Bwp0DwdXAS8GGtVTBgySJQGfrGkGvk6vAyExXv2E0GkHZpYzAH3F
0QE3EUD+aMIG+NZ5GwP51REC/x1O//n/kwPKZgsH+6io/zl9hwZSUkj66VW
7ArPdmwA==</confirm>
</track>
<track number="13">
  <base>faZtwaaAVfkHLvRNBzYbpwA/0Wz8ahqlBlYJBQaQxxj4UMQvAjSs+wa9
dGcCJb16/wP+5PukvPMC3QELBmdTyQGP5ScFykBVA2gIEv81RAcHwOEdB
9VviQBDwiMAx3xrBbgwW3QJyjj8Du+jnBmRwnwCCGuMAEMyu/3nZEP3G8I
8HgPapBOYvzQH6dhj4lmMdARsMQwXFm4kDH2sHATGCbwIyVeECaVl5A
TL+bvxUeZEA2jOfAxe5awNbaCkATcWnBuF4NwDtbqb+WtPTAfDQYQYGJg
UHIhKU/qsWAwO/QGsGh1Pa+DUVWP54M0UDZAunA+fxuQfN5CMA0Khn
Bm1IQQQ==</base>
  <confirm>/O52wajuSUES70FBkU8cQCyFB0G0D1ZBT+qNQODOf8BT7enAho
X6wJgi0ECM0GnANZeqv5ND5L85JebAaIKiP0+nz8Bz5oXBurK0wT63+78En
EC/qf4GwdW5Dz8RCARBR07jwLOBiUDLWmJBEtOEvuJkNT9yGSVBY3qw

APPENDIX A-continued

P/OF28COZPA/EyaawL0CDUEMMAxBFxcJwbdqRUBG3vjAKjQIQMVZ4sDo
4wrAwECvwGO1vEBoYzNBqhqhQAAvx783AlvBQQIZwc1rkz7uGuC//tgPQb3
WMcFc7QlAQiOCQFeL0MAmvn7A6svFQLxUj8G/wkNBD/8owfBYAUF6+YL
Ad45gQQ==</confirm>
</track>
<track number="14">
 <base>tzqhwG4yhEB1xgHC6aw/QIOVgsAlO5rAQDe0QBtOh8EBabHA7p1uQ
GUrS8BdoppASSinwMV6Dz1+o07AP41rweFIDMEOf04+Rv/FQGw/JkAzo/A+
DBmFQVR390C6VUxBmPd1P/cksUCBlKHAvMKqv5RN6cDay+nA2uLZQBO
/sUAgpuq/3W5WQHMBTcHO/CnBM3PLPz36CMD8uetAOD5uwalYmL8MY8
PAzrZFwSw0BkE7gotAvhapQFtFkL9A2nLAehjNQEuGxj9HpSJByq9vwb7pej8t
MgDBDi8yQT4NkcCNb85A2sowwYs5N8HGHDZB2oQ4wD2iBMH0nEvAyRs
8vw==</base>
 <confirm>knogwWPaSUHd/aHBmK2CwPh8wMGmBJTA/B+6QVTgvsEkZhX
ATCQOwaCkAsHrN5VAiFF5wUrrCkGnV3PAWSWuwXovEEAeTnlBb00KwX
k0s0C1VSs/PBUAwQ5pPME1uA9B1VzaQItgzcCFhx9AXUkDQeoALj/TS/a+H
7q0QBArIUEQbM+/fOC/v4QmA0HCx72/lkBUwA3OlEE1ukzAJyu9wCv8pL8ll
0zA6u0pP+rdzr8etQZBBrJHPYhOuT+9eC7A3STLPyPzu8C6hGBB/kY9P+RVc
kAefLHAgYDTQEHbs0Al3O9Ak3MkQWN2CsAWjVnA978NwE3oREEoCQF
BF2Y7QA==</confirm>
<track>
<track number="15">
 <base>GfWzQR8wtECHSLpA75wrwMNt9z+n/k4/i5jUwOLwK0GvtrPBM/EDw
Mxeb8ElGPbA9T54QIk7pr869hZBlsaFwQFJGcHMdPC//OaHwJGChMFNXfPB
TwS+wR26asGY3/E/XiAoQW+BaEGwblrBrAanQCPbB8DafFVBnbq3wLed50F
rOshALSZjQYa4mMAr4F1A+lMMQRJ3ocA99txA9XDBvyQToMBhLtLAG+Y
aQYD1jcA8ER9BruqSvsPglcA//pzAEa1CP3fLBECYYUG/H3/Ov9Ffn8AJ3x/A
Q7+QQflaJsAh6ABAr6K2P4UtJUFGktG/DiWxwIeabsDNZwdAdMp0vw==</base>
 <confirm>+E+EQSmri0EZoYJB7ZYWQZOjscDlQczB4Cp1wHeThj+XQ66/SpK
/wElpiEHwf0tBmHigvi97Z0EwZUHB9k93wNDSg0ETpxRB0a0sQbTTFsEKCE
ZBUDG4QV7rAMFzug3BgDOHwB4Og8F8aZzBMjywwGI1T0FetcTACW8eQc
OJfcCry87AA5BnwWb2IMFAyB9Acz1uwGpMe8AeupQ/izczwXHz6r8gbpJAu
C4lP6L2qsCz09I+mZ7CQMw/W8CzwptAyHsGP7SgXEFIjsrAKPZNv4VLeD9S
yB+/PRGsQIrPcEDbJV++NEUiwRt3zsCFC2dBK3wEwbwsHsHt16PA7TRbQA
==</confirm>
</track>
<track number="16">
 <base>CCoYwmWHiD88vLtA+eufvxVuicAyYbrASLMKQWox5kCQfDpBAR2
1QI+8wsDEzKm/Jlc6QRF3Q8FjS/xArt0tQA2FvsCuzQRBm4z/QPv82j8a1QrBA
OmfQYw8LsHYC/jAk2E2QeIGFUCa0yxAu5sowYT0T0DoB08/BtqBwJcY5MC
2TyrB2NMbwWIwEcEJKGTAwsKuQGeXm7/1983Ap2OLQA2e30AqllJAAPQ3
vwiQa8CJ+iw/3wNCP1hSt0BUrKFA66BjwOJWrED1yuNAaPYzwEWZbT/nlgr
AxQ2zP0pdjsDYbFG+ZrjyQJuAt8DWe06/HGGPPiKZbj8CZ3tA4FQ7QA==</base>
 <confirm>9+0WwsfbDsB5naJAaQJswFT/u8DQxKrA3n3jQOZCzUAKK25BMr
GzQIsoP8BQD0jAkSk+QYny+sDg3wBBGzSCv/a2D8He3hRB67DXQEA50kB7
MpDANCKJQZMdg8CUsY/B52nRQNzG5D+1LQRB2U/wwLNeBEEaMmJAH/
wuwANHgsB19EbBCyLmwIrsm8A2tYw/Q+xVQGr4VsCDyfPAyipZwLDEl0B
Heg5A6L/7vutW08D1GqnAC0QfvpAcnkBBzDFA1UpiwFepDEBcer0/00X2vx1
JNT/OfGBA5SWYQBq710CdldE/RRqXQDRi2sBXGaG/JJpIvTXOe0BdeR1Bo
9y7QA==</confirm>
</track>
<track number="17">
 <base>EC+yPlcYQkGdvNBB0udRQdd580BCpbLAcdMewJSRsj+2cY3BTnQPQ
dyejEHtuR/BVXZhwZFmZMD1dlhBKy4bwUkDiUGMJi3BFc/owIpu0T5xrQBA
NZ1cwGNxDUCxVBRBDBaHQBltfECLhtQ/xhnFQLYLBkCF/NLADX18QFbt
O0EroJk/m0pJwHOyl0CVF4zAolqMwM2sTsB7yAPAjTryP1x4PEB2v/HAKd/o
QKsVjcBOjSrAu4W6P/7opb/kWSLAjZx+wMn/xEBHY7hAyElIPm4Q4D8q7L3
ARoJIPcrWF78m+TBBc5WMQP33RcE3QQLAxtQWwC0Vs8DgQl7ArWfWvw
==</base>
 <confirm>mIYSwUEmzkB17plBItheQQSBzcDNM6hAdnaUv/78WT173DnBhc6
dQWeBVUHySlzBE4lRwWJwx8CywANB2XAewR55IMBoNC/BtddLwE9IBU
HpiTbA2qazwEmjnkDMTrJAc2iPQLx0UECEqj9A8gJlQJdESECNo2XAbAwgv
oKhb0EiKEpBXBGtQZfu/D/Pc9LAbl/hP+j5/kCSnopALfJWwGcy6ED0IcTAn7
CYQPTBI74B7yhBGKnyvrbVZMEvRoC+nfLqwBUY0ED/S0xB98ofQfkDUEC
7YznBmDxpQMevSMGrMexAftUAwQHfHD+fU/M/H3ECwQe5qkDX9F1AHu
o4wQ==</confirm>
</track>
</DAI>

What is claimed is:

1. A method of building an authoritative database of digital audio identifiers from digital media accessed by clients, said digital media including one or more media items, said method comprising:
uploading a candidate base digital audio identifier along with a known identifier for each media item on multiple copies of digital media accessed by one or more clients, each of said candidate base digital audio identifiers identifying a physical characteristic of the actual audio contained in the corresponding media item;
processing the uploaded candidate base digital audio identifiers for each media item to create an authoritative base digital audio identifier for each media item of said digital media, said processing comprising:
ignoring any candidate base digital identifier associated with a respective media item, wherein the difference between the ignored candidate base digital audio identifier and other candidate base digital audio identifiers for the respective media item exceeds a threshold; and
aggregating each of the uploaded candidate base digital audio identifiers associated with the respective media item, said aggregating comprising averaging all of the uploaded candidate base digital audio identifiers associated with the respective media item that have not been ignored; and
adding the authoritative base digital audio identifiers to an authoritative database of authoritative base digital audio identifiers associated with other digital media.

2. The method of claim 1 wherein uploading the candidate base digital audio identifiers along with the known identifiers comprises uploading a table of contents identifier (TOC) associated with each of one or more compact discs (CDs) accessed by at least one of the clients, wherein the TOC is the known identifier.

3. The method of claim 2 further comprising uploading a candidate base digital audio identifier for each media item from a plurality of copies of said CD accessed by a respective plurality of distinct clients and uploading a TOC associated with each of said plurality of copies of said CD accessed by respective plurality of distinct clients.

4. The method of claim 1 wherein said digital media comprises a CD and wherein said uploading occurs when at least one of the clients rips said CD or inserts said CD into a compact disc read-only memory (CD-ROM) drive.

5. The method of claim 1 further comprising uploading a candidate confirmation digital audio identifier for each media item on said multiple copies of the digital media accessed by the clients.

6. The method of claim 5 wherein uploading the candidate base digital audio identifiers comprises uploading said candidate base digital audio identifiers from a first time interval of each media item on said digital media and wherein uploading the candidate confirmation digital audio identifiers comprises uploading said candidate confirmation digital identifiers from a second time interval of each media item on said digital media.

7. The method of claim 6 wherein the second time intervals for uploading the candidate confirmation digital audio identifiers are about 20 seconds later than the first time intervals for uploading the candidate base digital audio identifiers.

8. The method of claim 1 wherein processing the uploaded candidate base digital audio identifiers comprises comparing each of the uploaded candidate base digital audio identifiers associated with a respective media item to one another.

9. The method of claim 1 wherein said processing further comprises ignoring any candidate base digital audio identifier wherein the difference between the ignored candidate base digital audio identifier and the average of the uploaded candidate base digital audio identifiers is greater than some multiple of the standard deviation of the candidate base digital audio identifiers.

10. The method of claim 9 wherein said multiple of the standard deviation is 1.5.

11. The method of claim 10 wherein processing the uploaded candidate base digital audio identifiers further comprises selecting the most common TOC of the various TOCs associated with a particular CD as an authoritative TOC.

12. The method of claim 1 wherein said digital media comprises a CD and wherein processing the uploaded candidate base digital audio identifiers comprises generating an authoritative base digital audio identifier associated with each respective media item of the CD for identifying each media item of the CD.

13. The method of claim 1 wherein uploading said candidate base digital audio identifiers from copies of said digital media is terminated once the authoritative base digital audio identifiers associated with each respective media item are added to the authoritative database.

14. The method of claim 1 wherein one or more computer-readable media have computer-executable instructions for performing the method recited in claim 1.

15. A method of building an authoritative database of digital audio identifiers from digital media accessed by clients, said digital media including one or more media items, said method comprising:
uploading a candidate base digital audio identifier along with a table of contents identifier (TOC) for each media item on multiple copies of digital media accessed by one or more clients, each of said candidate base digital audio identifiers identifying a physical characteristic of the actual audio contained in the corresponding media item, wherein each copy of digital media is a compact disc (CD);
processing the uploaded candidate base digital audio identifiers to create an authoritative base digital audio identifier for each media item of said digital media, said processing comprising selecting a most common TOC of various TOCs associated with a particular CD as an authoritative TOC; and
adding the authoritative base digital audio identifiers to an authoritative database of authoritative base digital audio identifiers associated with other digital media.

16. The method of claim 15 wherein said candidate base digital audio identifier comprises a sample of the media item taken at a first time interval and said candidate confirmation digital audio identifier comprises a sample of the media item taken at a second time interval.

17. The method of claim 16 wherein said first time interval is about 30 seconds from the beginning of the media item and said second time interval is about 50 seconds from the beginning of the media item.

18. The method of claim 15 wherein said processing further comprises ignoring any candidate base digital audio identifier wherein the difference between the ignored candidate base digital audio identifier and the average of the uploaded candidate base digital audio identifiers is greater than a multiple of the standard deviation of the candidate base digital audio identifiers.

19. The method of claim 18 wherein said multiple of the standard deviation is 1.5.

* * * * *

UNITED STATES PATENT AND TRADEMARK OFFICE
CERTIFICATE OF CORRECTION

PATENT NO. : 7,647,128 B2  
APPLICATION NO. : 11/112026  
DATED : January 12, 2010  
INVENTOR(S) : Jaffray et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this

Twenty-eighth Day of December, 2010

David J. Kappos  
*Director of the United States Patent and Trademark Office*